US008945375B2

(12) United States Patent
Friezner et al.

(10) Patent No.: US 8,945,375 B2
(45) **Date of Patent: *Feb. 3, 2015**

(54) FLUID FLOW CONTROL AND DEBRIS INTERCEPTING APPARATUS

(71) Applicants: Denis Friezner, Granada Hills, CA (US); Scott Alberts, Burbank, CA (US)

(72) Inventors: Denis Friezner, Granada Hills, CA (US); Scott Alberts, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,550

(22) Filed: Aug. 22, 2013

(65) Prior Publication Data

US 2014/0041744 A1 Feb. 13, 2014

Related U.S. Application Data

(62) Division of application No. 12/925,981, filed on Nov. 3, 2010, now Pat. No. 8,535,523.

(51) Int. Cl.
*E03F 5/14* (2006.01)
*B01D 35/28* (2006.01)

(52) U.S. Cl.
USPC ............ 210/131; 210/156; 210/170.3; 404/4; 405/100

(58) Field of Classification Search
None
See application file for complete search history.

(56) References Cited

U.S. PATENT DOCUMENTS

| | | | | |
|---|---|---|---|---|
| 506,267 | A * | 10/1893 | Sefton | 210/163 |
| 528,821 | A * | 11/1894 | Story | 49/10 |
| 766,850 | A * | 8/1904 | Smith | 49/10 |
| 818,288 | A * | 4/1906 | Race | 210/122 |
| 906,562 | A * | 12/1908 | Rue | 210/131 |
| 910,717 | A * | 1/1909 | Olson | 49/12 |
| 944,907 | A * | 12/1909 | Powers | 210/156 |
| 1,225,160 | A * | 5/1917 | Nihart | 210/154 |
| 1,709,291 | A * | 4/1929 | Vidler | 210/155 |
| 1,861,031 | A * | 5/1932 | Schmitt | 405/35 |
| 1,999,637 | A * | 4/1935 | Pettepher | 210/156 |
| 2,018,580 | A * | 10/1935 | Schonhoff et al. | 160/196.1 |
| 2,636,296 | A * | 4/1953 | King | 49/10 |
| 4,110,216 | A * | 8/1978 | Wagnon et al. | 210/156 |
| 4,356,087 | A * | 10/1982 | Miles | 210/131 |
| 8,535,523 | B2 * | 9/2013 | Friezner et al. | 210/156 |
| 2005/0051467 | A1 * | 3/2005 | Yehuda | 210/156 |
| 2012/0103883 | A1 * | 5/2012 | Friezner et al. | 210/156 |
| 2014/0041744 | A1 * | 2/2014 | Friezner et al. | 138/39 |

* cited by examiner

*Primary Examiner* — Robert James Popovics
(74) *Attorney, Agent, or Firm* — James E. Brunton

(57) ABSTRACT

A fluid flow control and debris intercepting apparatus for controlling the flow of fluid and the introduction of debris into the entrance of a water diversion system such as a curbside storm drain.

7 Claims, 13 Drawing Sheets

FLUID FLOW CONTROL AND DEBRIS INTERCEPTING APPARATUS

CROSS-REFERENCE TO RELATED APPLICATIONS

This is a Divisional application of co-pending U.S. Ser. No. 12/925,981 filed on Nov. 3, 2010.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to storm water control systems. More particularly, the invention concerns a fluid flow control and debris intercepting apparatus for controlling the flow of fluid and the introduction of debris into the entrance of a water diversion system such as a curbside storm drain.

2. Description of Related Art Including Information Disclosed Under 37 CFR 1.97 and 1.98

The control of excess runoff rain water has long been a problem faced by municipalities throughout the civilized world. Heavy rainfall can create large volumes of runoff that must be handled effectively in order to avoid flooding, that can result in road closures and substantial property damage. Accordingly, most municipalities have installed drain systems that include curbside drains that are provided at spaced apart locations along most thoroughfares. The curbside drains typically lead to main drain pipes that carry the water to adjacent rivers, directly to the ocean, or to remote catch basins.

While the prior art drain systems have, for the most part, proven effective in carrying runoff storm water away from the streets and populated areas, the control of man-made and natural debris entering the drain systems remains a major problem. For this reason, various attempts have been made in the past to prevent unwanted debris from entering into curb side drains. These prior art attempts have included placing plates over the drains that are specially configured to trap the debris and still provide limited space for the water to flow. This approach has generally proven unsatisfactory because, as a general rule, the drains cannot adequately accommodate the runoff during heavy rainfall events. Other attempts have been made to design curbside drain gates that remain closed during city periods, but open during moderate to heavy rainfall events.

U.S. Pat. No. 3,945,746 issued to Bredbenner illustrates one prior art approach to providing a specially configured catch basin curb inlet opening cover that comprises a rectangular grating panel that is adapted to be supported in a stationary frame surrounding and opening of a storm drain inlet. U.S. Pat. No. 7,611,304 issued to Lill et al. illustrates another prior art approach to providing a specially configured catch basin curb inlet opening cover.

U.S. Pat. No. 7,234,894 issued to Flury discloses an automatically openable and closable gate system for use with street side curb openings that includes a gate which during dry and low flow water drainage situations is in a closed position and during periods of heavy rainfall will automatically open. U.S. Publication No. 2008/0226390 discloses a system that is somewhat similar to the Flurry system and includes an automatic fluid channel screen lock-unlock system for automatically locking and unlocking a screen that is disposed within a fluid channel wherein the screen is rotatable relative to the channel from a closed position to an open position.

The prior art fluid channel screen lock-unlock systems have frequently proven to be unsatisfactory because the screens tend to jam in the locked position causing unwanted flooding.

BRIEF SUMMARY OF THE INVENTION

By way of brief summary, the present invention comprises a fluid flow control and debris intercepting apparatus for controlling the flow of fluid and the introduction of debris into the entrance of a conventional curbside storm drain of the character having spaced apart side walls that define a fluid flow channel through which fluid flows. In one form of the invention the apparatus comprises an elongated, yieldably deformable support in the form of a cable under tension that substantially spans the fluid flow channel and a plurality of transversely spaced apart flow control vanes that are connected to the cable. The flow control vanes function to control fluid flow through the curbside drain and work in tandem to block the entry of unwanted debris into the storm drain. To accomplish this purpose, the flow control vanes are pivotally movable between a first at rest position and a second position wherein an increase in fluid flow through the fluid flow channel is permitted. The system further includes a mechanism for controlling the tension in the elongated, yieldably deformable support cable and thereby controlling the resistance that is offered by the system to the flow of fluid through the fluid flow channel and the entry of objects into the storm drain.

With the forgoing in mind, it is an object of the present invention to provide an apparatus that effectively controls the flow of fluid and the introduction of unwanted debris into the entrance of a curbside storm drain.

Another object of the invention is to provide an apparatus that can readily be installed by unskilled workmen in curbside storm drains of varying standard and nonstandard construction.

Another object of the invention is to provide an apparatus of the aforementioned character that effectively prevents the entry of unwanted debris into curbside storm drains during conditions of low to moderate rainfall, but may permit the free entry of debris into the storm drain during conditions of heavy rainfall.

Another object of the invention is to provide an apparatus of the class described that can be specially tailored to accommodate directional fluid flow as, for example, downhill fluid flow.

Another object of the invention is to provide an apparatus of the described in the preceding paragraph which, because of its unique design, cannot jam and will automatically open to permit fluid flow through the flow control channel when the flowing water impinges upon control vanes.

Another object of the invention is to provide an apparatus as described in the preceding paragraphs that is easy to install and in no way affects the structural integrity of the curbside storm drain.

Another object of the invention is to provide an apparatus of the class described in which the flow control vanes of the apparatus can be readily modified for use in storm drains of varying height and width.

Another object of the invention is to provide an apparatus of the class described in the preceding paragraph which, because of the unique design of the light weight flow control vanes of the apparatus, permits a significantly higher flow volume of water through the fluid flow channel than is permitted by prior art devices embodying perforated flow control gates.

Another object of the invention is to provide an apparatus as described in the preceding paragraphs that is easily adjustable to accommodate varying fluid flow conditions.

Another object of the invention is to provide an apparatus of the class described in which advertising indicia can readily be imprinted on the exposed faces of the flow control vanes of the apparatus.

Another object of the invention is to provide an apparatus of the type described in the preceding paragraphs which when installed in no way obstructs travel along the street where the curbside storm drains are installed.

Another object of the invention is to provide a fluid flow control system that embodies materials that have little recyclable value so as to discourage theft of the apparatus for potential resale.

Another object of the invention is to provide an apparatus of the class described that is durable in use and one that can be inexpensively manufactured, installed and maintained.

DETAILED DESCRIPTION OF THE INVENTION

Figure 1:
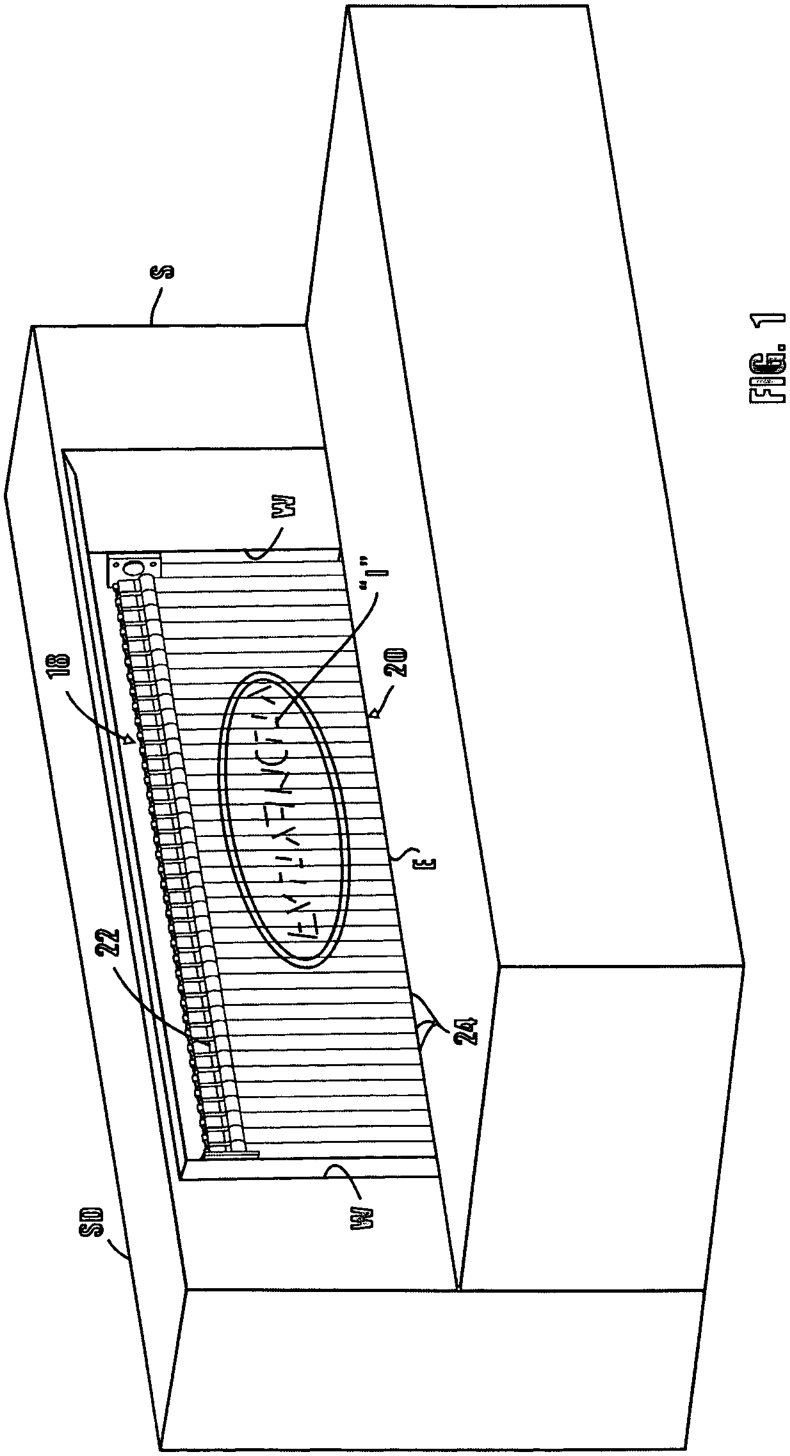
FIG. 1 is a generally perspective front view of one form of the fluid flow control and debris intercepting apparatus as it appears when installed in a conventional curbside storm drain.
Figure 2:
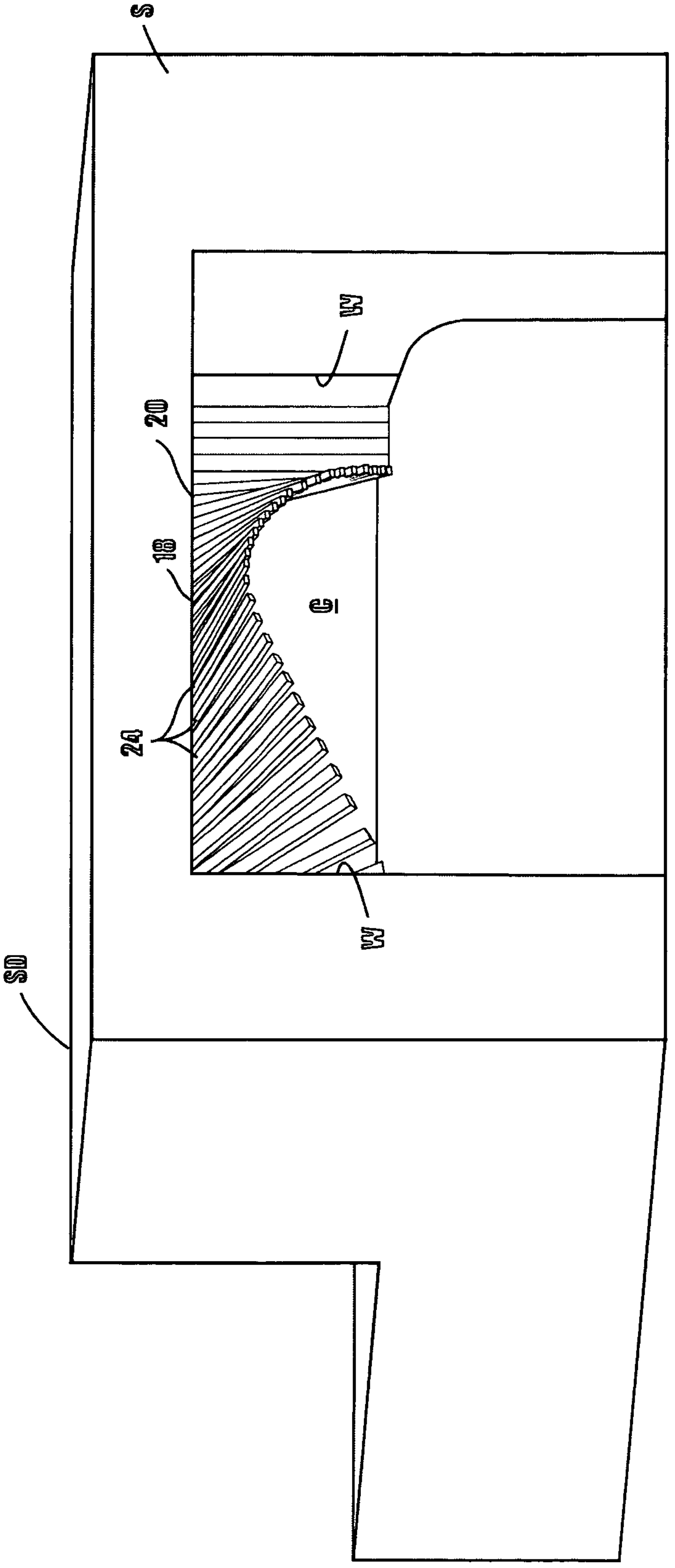
FIG. 2 is a generally perspective rear view similar to FIG. 1, but showing the fluid flow control and debris intercepting apparatus in an open position to permit fluid and debris flow through the flow channel of the storm drain.
Figure 4:
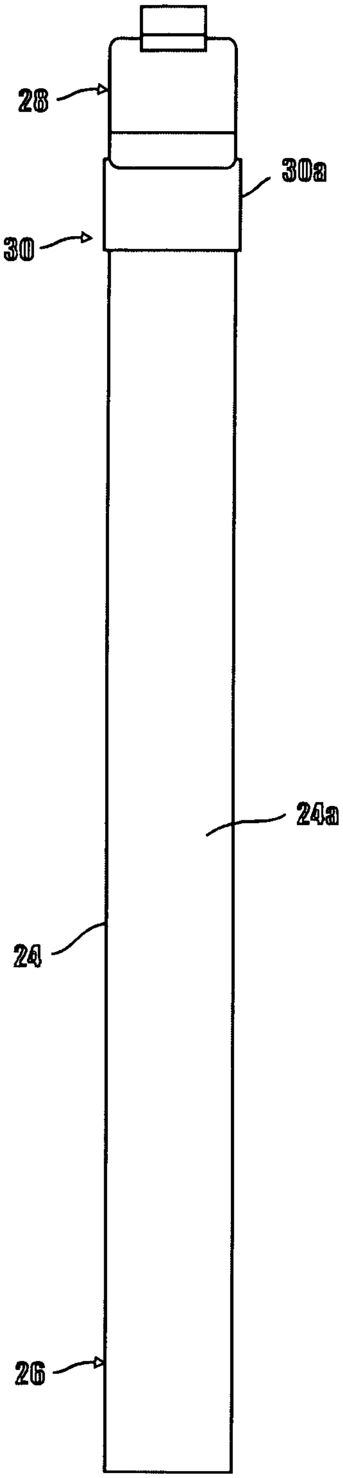
FIG. 4 is a greatly enlarged front view of one form of the control vane of the apparatus of the invention.
Figure 5:
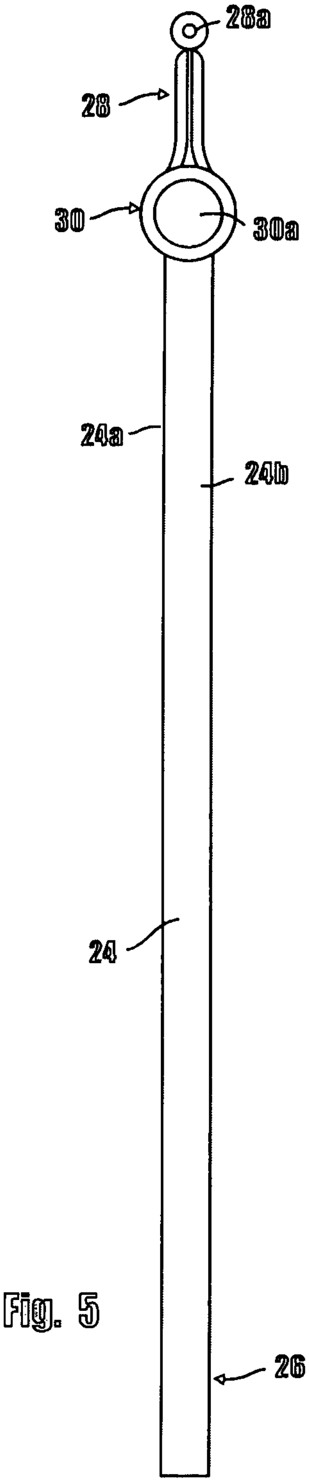
FIG. 5 is a greatly enlarged side view of the control vane shown in FIG. 4.
Figure 6:
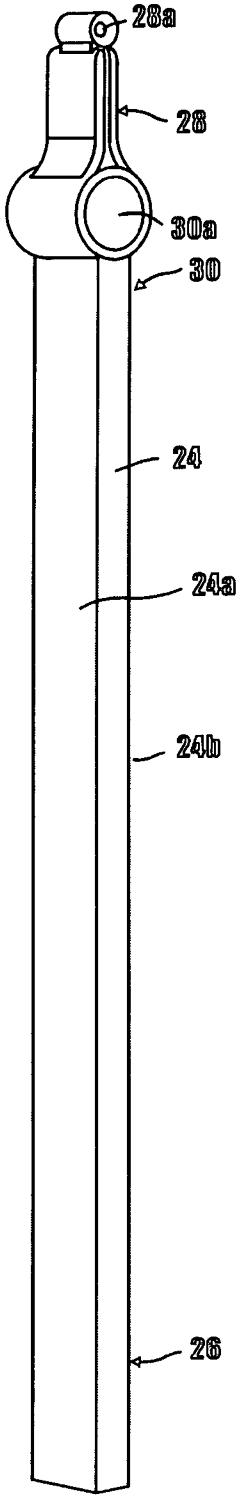
FIG. 6 is a greatly enlarged, generally perspective view of the control vane shown in FIG. 4.
Figure 6A:
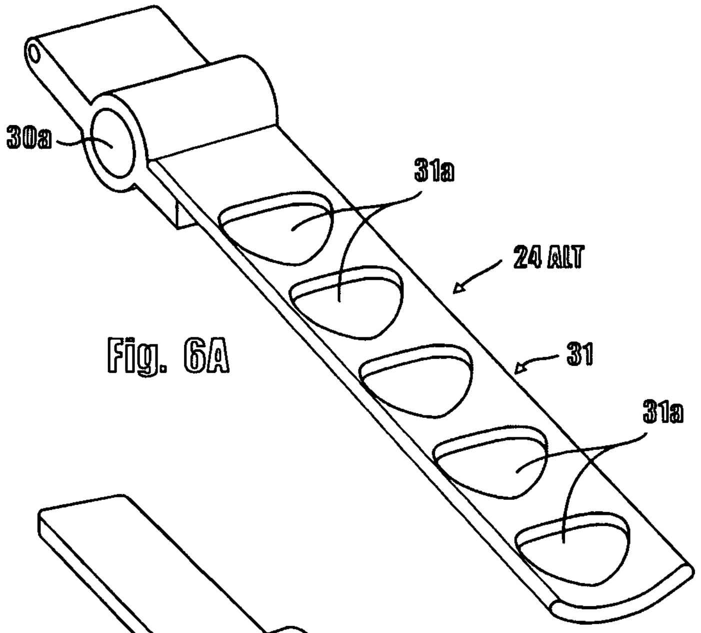
FIG. 6A is a greatly enlarged, generally perspective view of an alternate form of control vane.
Figure 6B:
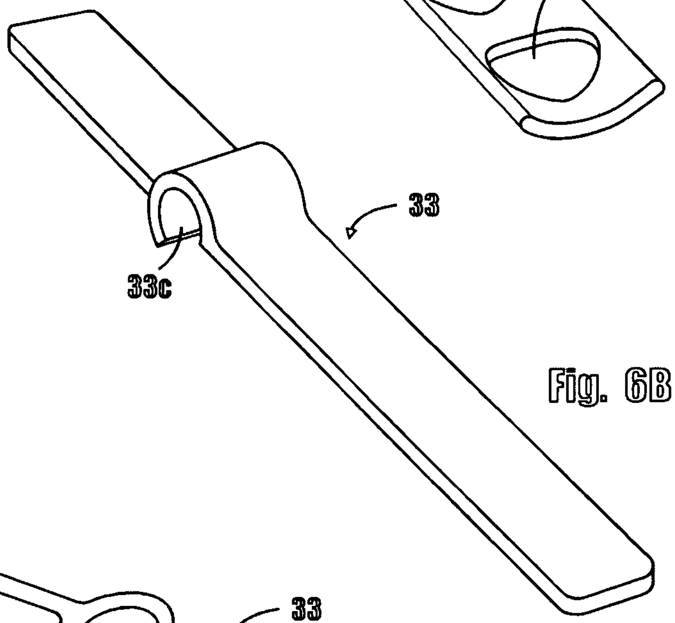
FIG. 6B is a greatly enlarged, generally perspective top view of still another alternate form of control vane.
Figure 6C:
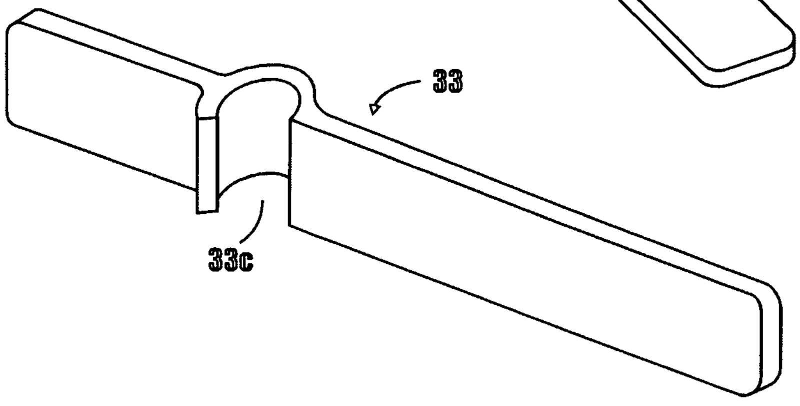
FIG. 6C is a greatly enlarged, generally perspective bottom view of the control vane shown in FIG. 6B.

Referring to the drawings and particularly to FIGS. 1 and 2, one form of the fluid flow control and debris intercepting apparatus of the invention is there shown as it appears when positioned within the conventional curbside storm drain. This form of the apparatus, which is generally designated in the drawings by the numeral 18, functions to control the flow of fluid and the introduction of debris into the entrance "E" of the storm drain "SD" that comprises a structure "S" having spaced apart side walls "W" that define a fluid flow channel "C" (FIG. 2) through which fluid, such as rainwater flows. In the form of the invention shown in FIGS. 1 through 3 the apparatus comprises a control gate assembly 20 that includes a support member 22 that is connected to structure "S" and spans the fluid flow channel "C". Support number 22 is here shown as an elongated, generally cylindrically shaped pivot rod having first and second extremities 22*a* and 22*b* that are disposed in engagement with the sidewalls "W" of the structure "S" (FIG. 1). Pivotally connected to support member 22 for movement between a first at rest position and a second position are a plurality of transversely spaced apart uniquely configured flow control vanes 24. Flow control vanes 24, which also comprise a part of the fluid flow control and debris intercepting gate 20, uniquely function to control fluid flow through the fluid flow channel "C" and to selectively block the entrance of debris into the channel. As shown in FIGS. 4, 5 and 6 of the drawings, each of the flow control vanes 24 has a front face 24*a*, a rear face 24*b*, a lower portion 26, an upper portion 28 and an intermediate portion 30. As best seen in FIGS. 5 and 6, the intermediate portion 30 of each of the flow control vanes is provided with an opening 30*a* that is constructed and arranged to slidably receive the support member 22. More particularly, in the form of in the invention shown in these figure drawings, the opening is provided in the form of a transverse bore that is constructed and arranged to slidably receive the support member 22. In an alternate form of flow control, vane 24ALT which is of the somewhat similar configuration shown in FIG. 6, the lower portion 31 of the control vane is curved and is provided with a plurality of spaced apart openings 31*a*. In another alternate form of flow control vane 33, which as of the configuration shown in FIGS. 6B and 6C of the drawings, the opening is provided in the form of a semicircular opening 33*c* that is constructed and arranged to releasably grip the support member 22. As indicated in FIG.

1 of the drawings, if desired, indicia such as advertising indicia "I" can be imprinted on the face of the control vanes 24.

Figure 7:
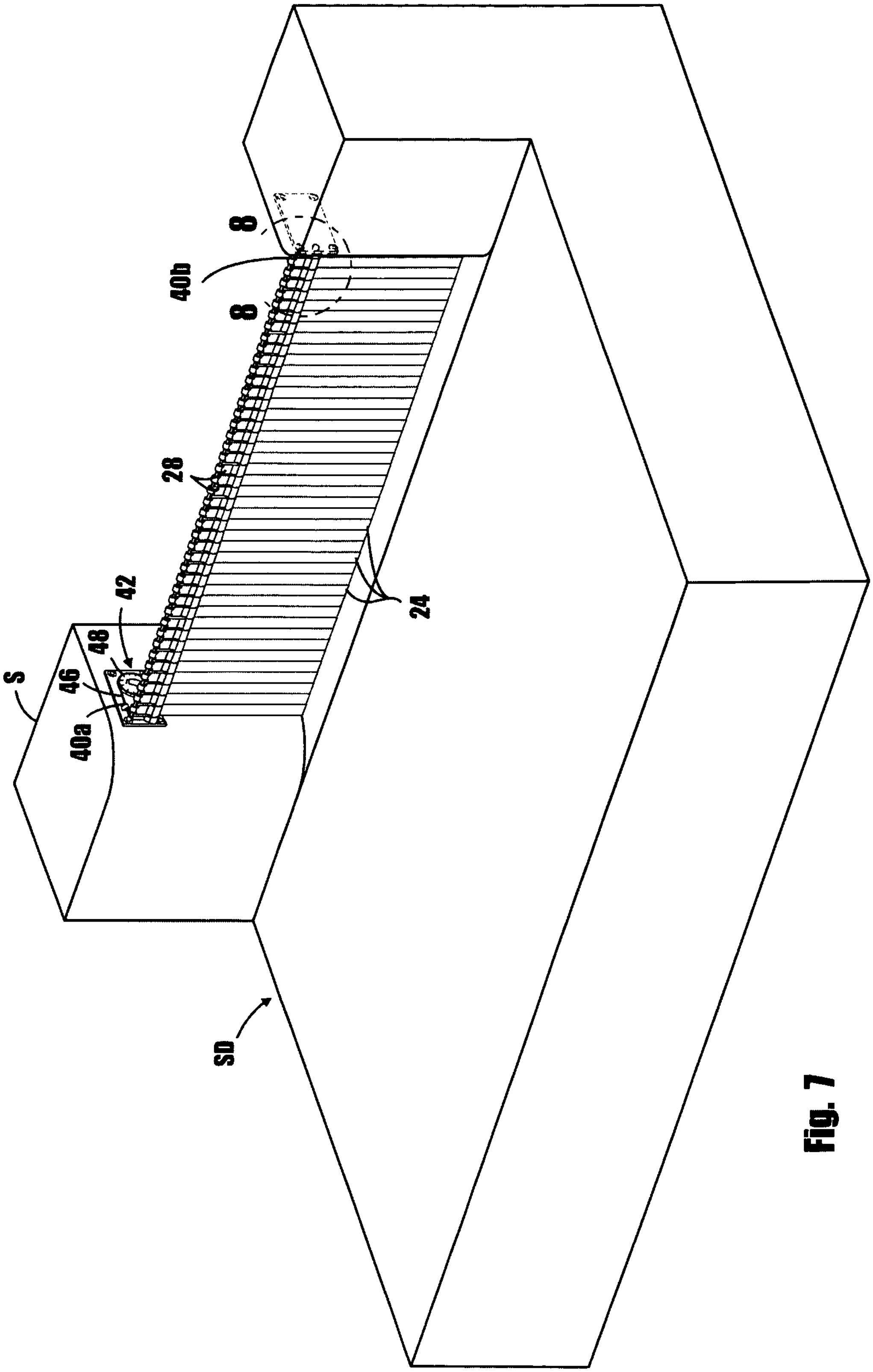
FIG. 7 is a generally perspective view of one form of the fluid flow control and debris intercepting apparatus showing the control gate in its closed position.
Figure 8:
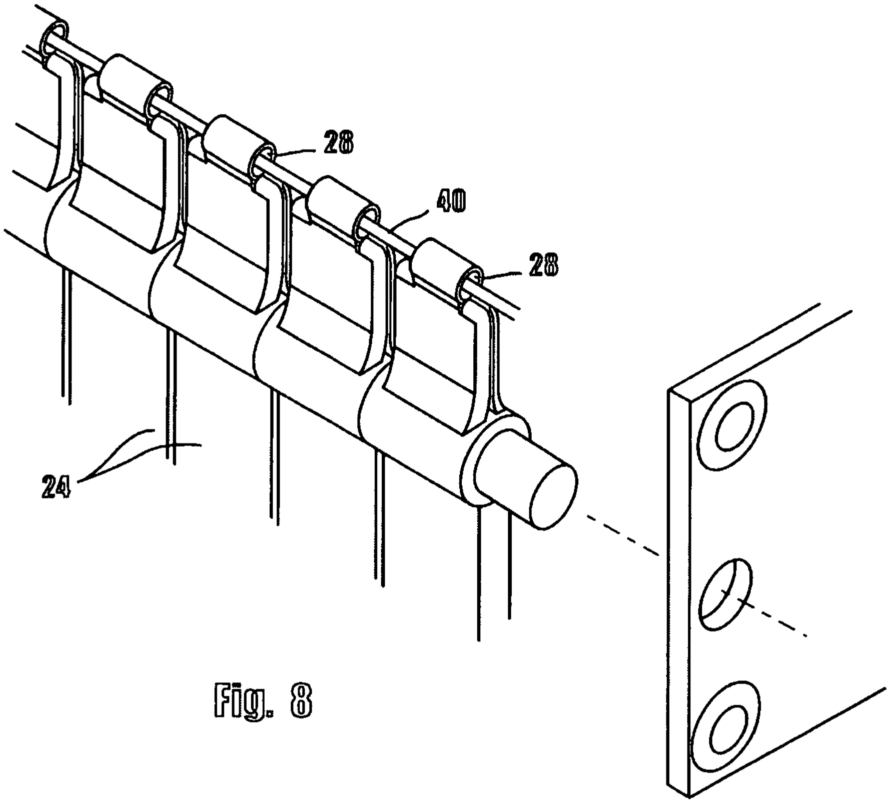
FIG. 8 is a greatly enlarged, generally perspective, fragmentary view of the portion of the control gate designated in FIG. 7 as "8".
Figure 9:
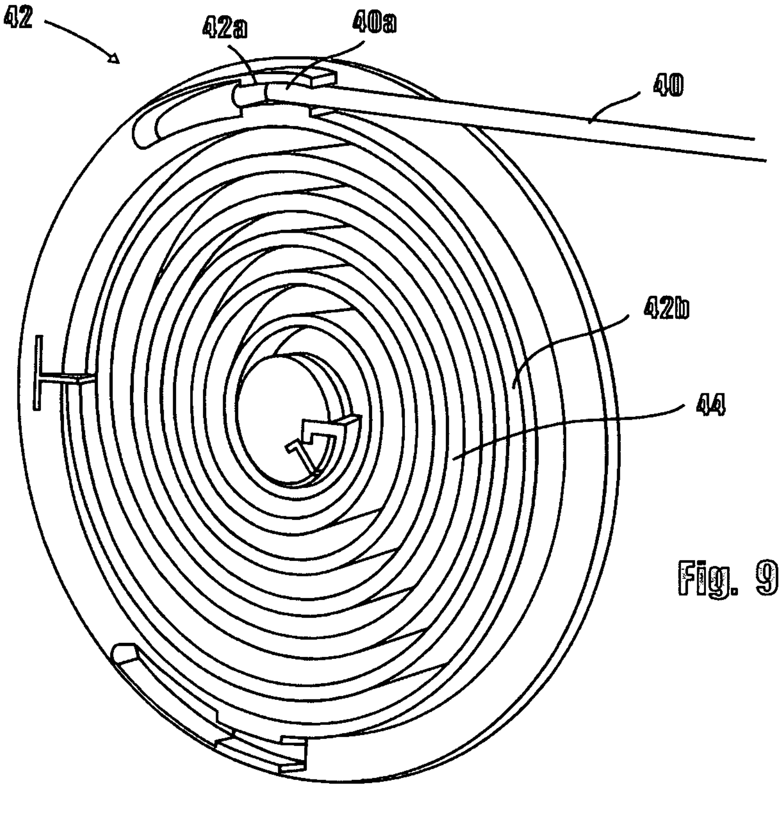
FIG. 9 is a greatly enlarged, generally perspective rear view of one form of the cable tensioning component of the apparatus of the invention.
Figure 10:
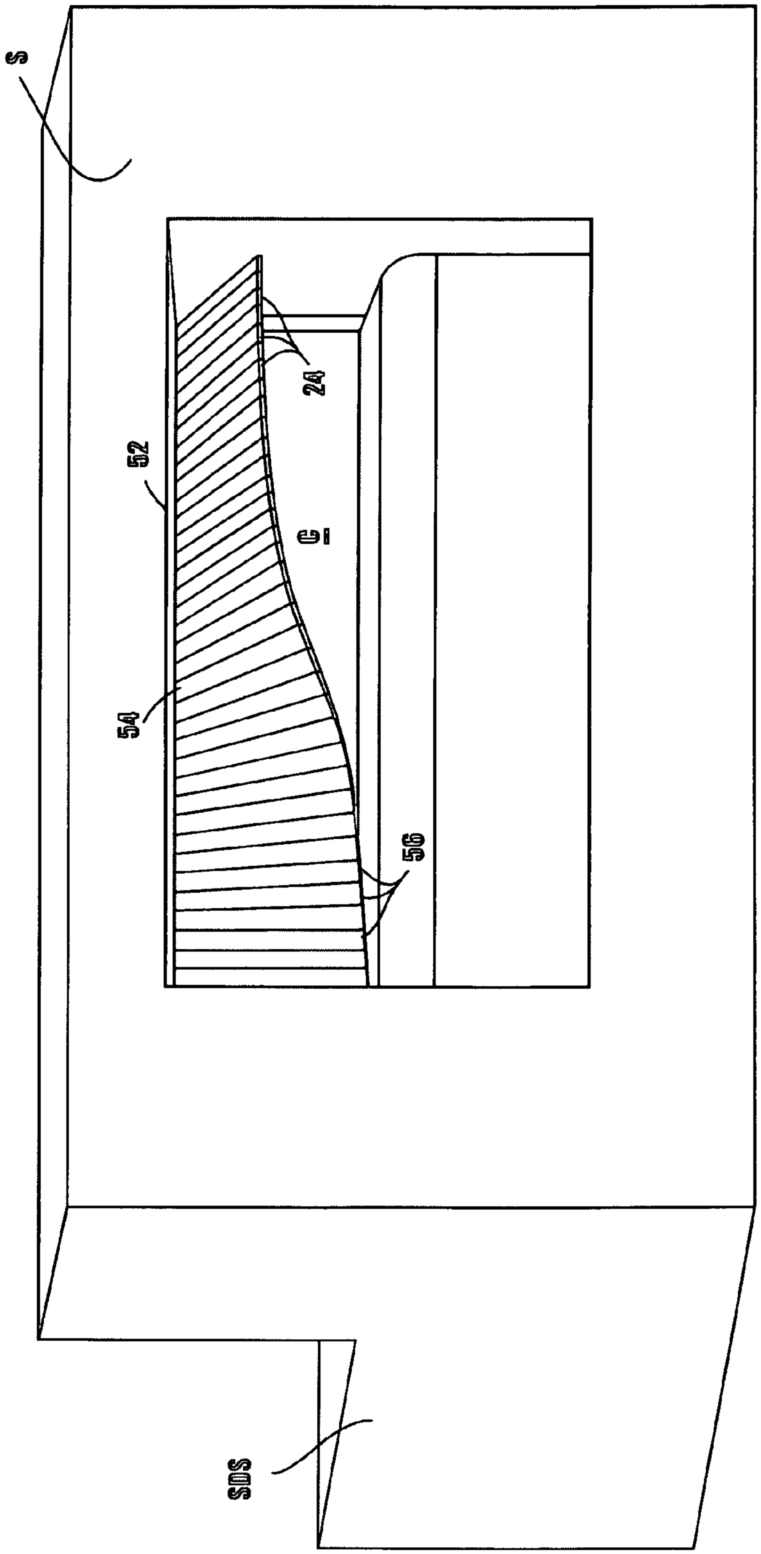
FIG. 10 is a generally perspective rear view of an alternate form of the apparatus of the invention for use in a storm drain that is disposed on an incline and showing the specially configured control gate of the fluid flow control and debris intercepting apparatus in a partially open position configuration.
Figure 11:
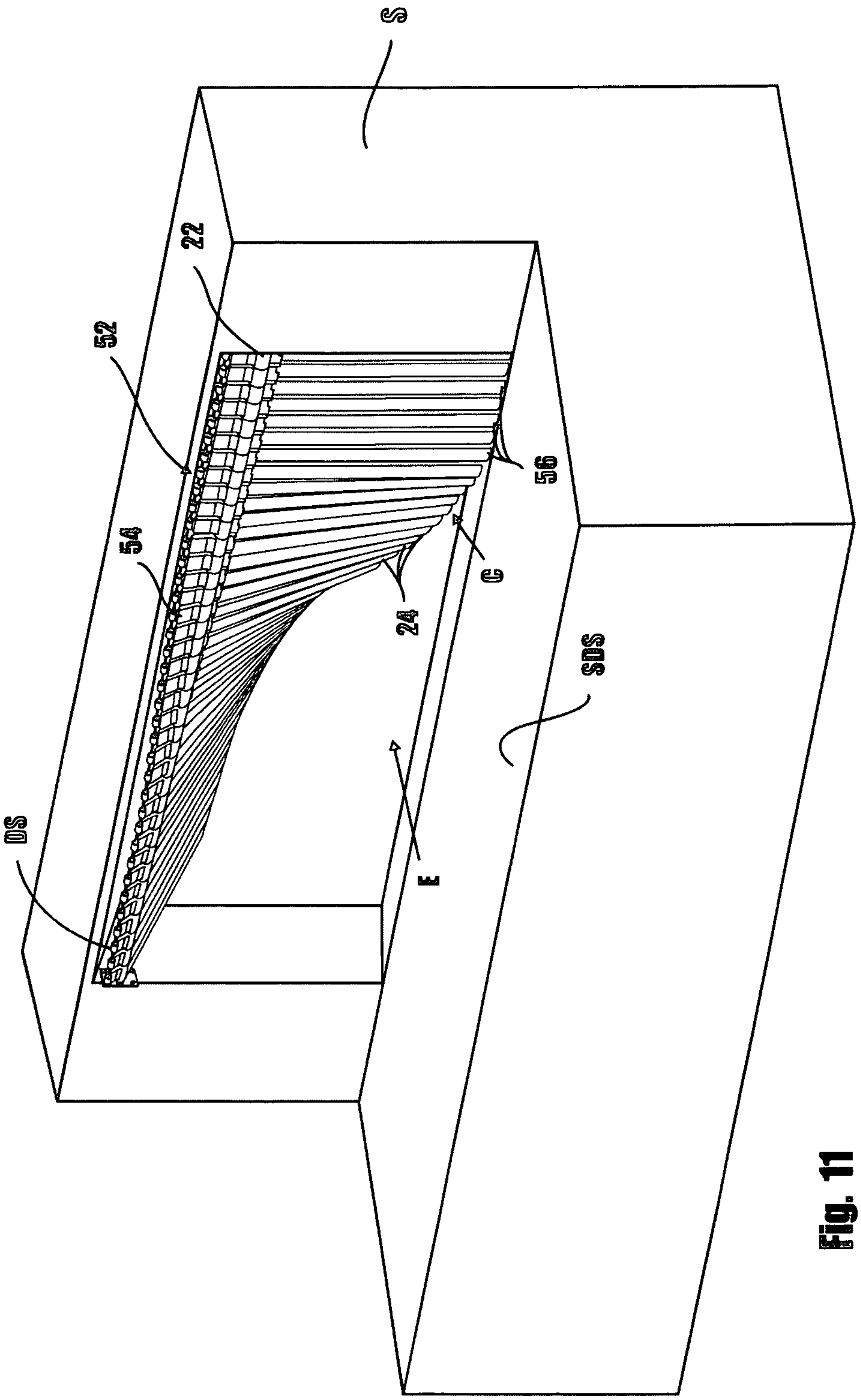
FIG. 11 is a generally perspective front view of the control gate portion of the fluid flow control and debris intercepting apparatus of the character shown in FIG. 10 as it appears in its partially open position.

Also forming an important aspect of the present invention is an elongated, biasing member, shown here as an elongated, yieldably deformable biasing cable 40 (FIGS. 7 and 8) having a first end 40*a* and a second end 40*b*. Cable 40 is received within openings 28*a* formed in the upper portion of each of the control vanes 24 (see FIGS. 5, 6, 7 and 8). Cable 40 uniquely functions to controllably resist movement of the vanes toward their second position. In a manner presently to be described, cable 40 is continuously maintained in tension and the degree of tension in the cable is regulated by a novel tensioning mechanism 42 that is carried by the structure "S". As best seen in FIGS. 7 and 9, this important tensioning mechanism here comprises a clock spring tensioning mechanism that includes a peripheral portion 42*a* to which the first end of the tensioning cable is connected in the manner shown in FIG. 9 of the drawings. The tensioning cable further includes a central portion 42*b* that carries a spiral spring 44 that is operably associated with peripheral portion 42*a*. As illustrated in FIG. 7 of the drawings, tensioning mechanism 42 further includes a faceplate 46 and a finger engaging knob 48 which is operably associated with spring 44 for regulating the tension on tensioning cable 40. Rotating the finger engaging knob 48 in one direction causes the spring 44 to rotate in the same direction as the finger engaging knob 48, thus pulling the tensioning cable 40 and increasing the tension on tensioning cable 40. Rotating the finger engaging knob 48 in the opposite direction causes the spring 44 to rotate in the same direction as the finger engaging knob 48, thus creating decreased tension on tensioning cable 40.

Figure 3:
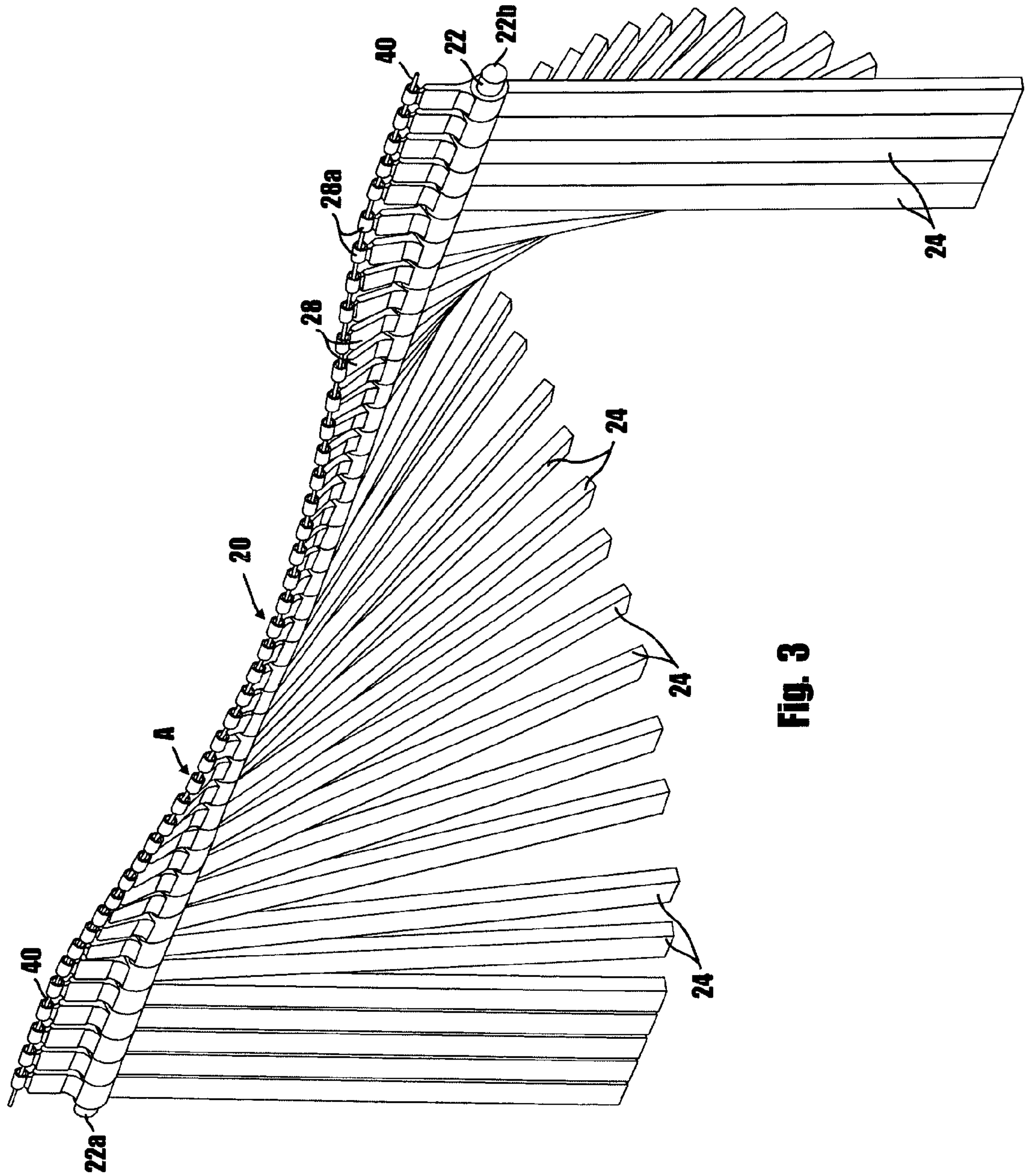
FIG. 3 is a generally perspective front view of the control gate portion of the fluid flow control and debris intercepting apparatus in its open position.

In using the fluid flow control and debris intercepting apparatus of the invention shown in FIGS. 1, 2, 3 and 7 of the drawings, the cable 40 is first tensioned in the appropriate manner by rotating the finger engaging knob 48 of the tensioning mechanism, which is operably associated with spring 44. As the water flows through the fluid flow channel "C" and impinges on the control vanes 24, the lower portions of the control vanes will tend to move outwardly in the manner shown in FIG. 3 of the drawings. However, since the upper portions 28 of the control vanes are interconnected with the cable 40, the cable will yieldably resist the outward movement of the control vanes, which outward movement is tending to move the cable into an arcuate configuration "A" (FIG. 3). It is apparent that the degree of tension placed on the cable 40 controls the amount of force that must be imparted on the control vanes by the flowing fluid to move the cable into the arcuate configuration shown in FIG. 3. The greater the tension on the cable 40, the greater is the force against the fluid flowing through the fluid flow channel "C" and impinging on the control vanes that is required to move the cable into an arcuate configuration "A" as is illustrated in FIG. 3 and to move the control gate into an open position. Conversely, the lesser the tension on the cable 40, the lower is the force against fluid flowing through the fluid flow channel "C" and impinging on the control vanes that is required to move the control gate into an open position. With this in mind, during periods of heavy rainfall when it is desired to encourage maximum fluid flow through the storm drain, a lesser tension is placed on the cable 40 so that the control gate can open widely to permit maximum fluid flow and also to permit debris, such as plastic bottles and the like that may build up against the control gate to flow freely into the storm drain. However, during periods of light rainfall when it is desired to accommodate the light rainfall, but at the same time to prevent debris from entering the storm drain, a greater tension is placed on the cable 40 so as to prevent the control gate from opening wide enough to permit the debris to move past the control gate and enter into the storm drain.

Turning next to FIGS. 10 through 13 of the drawings, an alternate form of the fluid flow control and debris intercepting apparatus of the invention is there shown as it appears when positioned within a conventional curbside storm drain located on the right side of a downwardly sloping roadway. This form of the apparatus which is generally designated in the drawings by the numeral 52, functions to control the flow of fluid and the introduction of debris into the entrance "E" of the downwardly sloping storm drain "SDS". This form of the apparatus is similar in many respects to the embodiment of the invention shown in FIGS. 1 through 3 and like numerals are used in FIGS. 11 through 13 to identify like components. In this latest form of the invention, the apparatus comprises a control gate assembly 54 of a somewhat different instruction that is made up of strategically positioned flow control vanes which, as will presently be described, are of two different constructions. As in the earlier described embodiment, control gate assembly 54 includes a support member 22 that is connected to structure "S" and spans the fluid flow channel "C".

Figure 12:
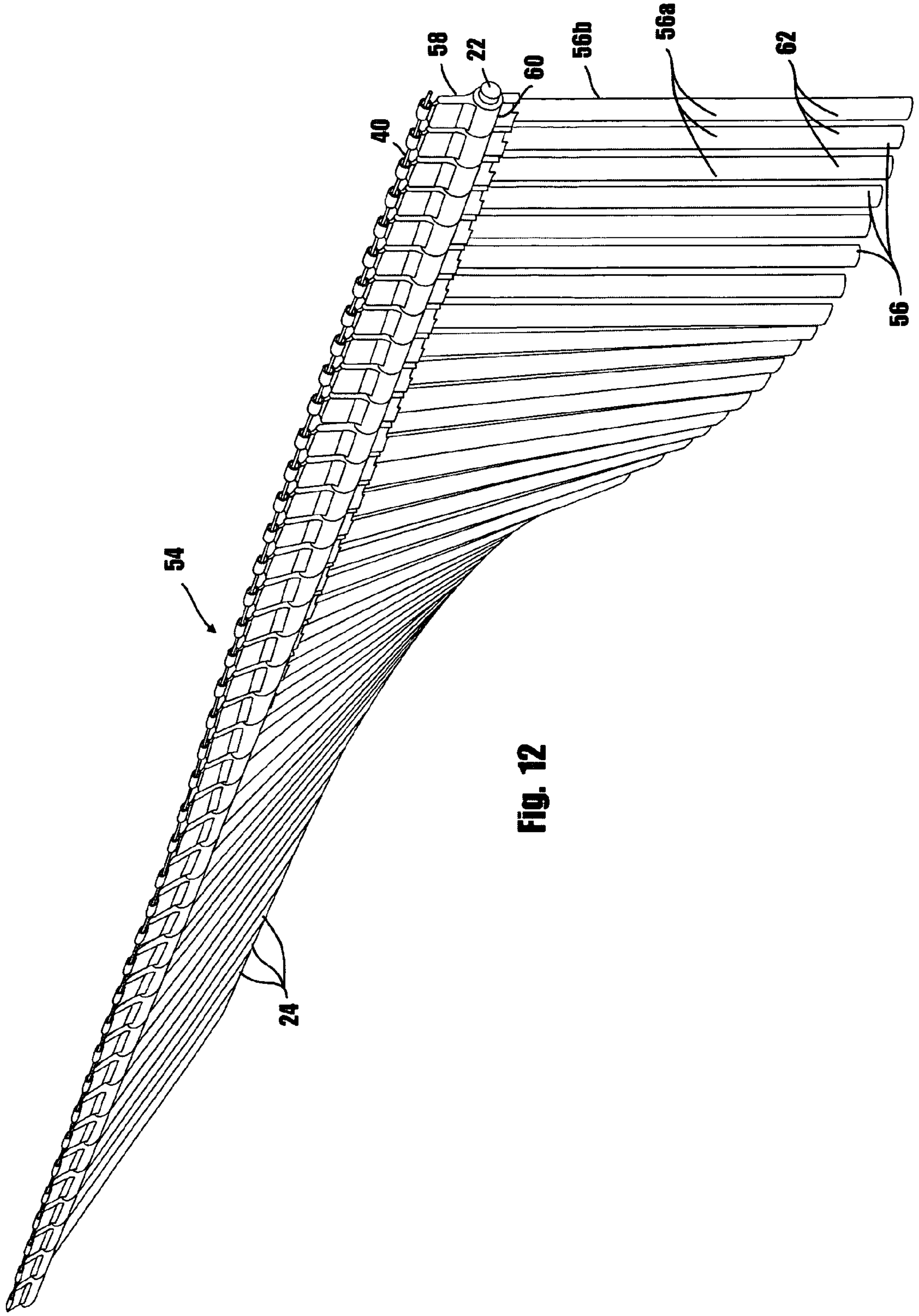
FIG. 12 is an enlarged generally perspective view of the control gate of the alternate form of the apparatus of the invention shown in FIGS. 10 and 11.
Figure 13:
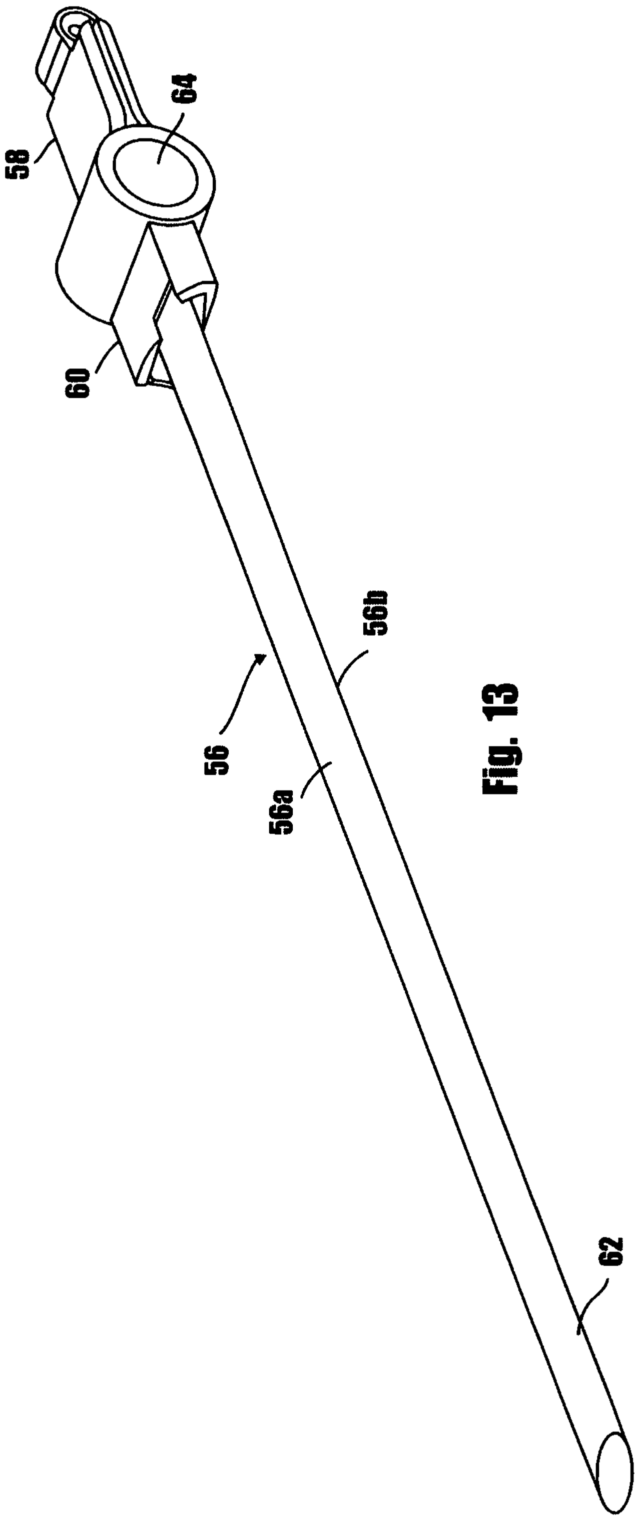
FIG. 13 is a greatly enlarged, generally perspective view of one of the specially configured control vanes of this latest form of the invention.

Pivotally connected to the down slope side "DS" (FIG. 11) of the support member 22 for movement between a first at rest position and a second position are a plurality of transversely spaced apart flow control vanes 24 that are of the construction previously described. However, pivotally connected to the upslope side of the support member 22 for movement between a first at rest position and a second position are a plurality of transversely spaced apart uniquely configured flow control vanes 56 that are of a different construction. More particularly, as illustrated in FIGS. 12 and 13, each of the flow control vanes 56 has a front face 56*a*, a rear face 56*b*, an upper portion 58, an angled intermediate portion 60 and a uniquely angled lower portion 62. As illustrated in the drawings, the intermediate portion 60 of each of the flow control vanes is provided with an opening 64 that is constructed and arranged to slidably receive the support member 22. More particularly, in the form of in the invention shown in these figure drawings, the opening is provided in the form of a transverse bore that is constructed and arranged to slidably receive the support member 22. As indicated in FIG. 13, the lower portion 62 of the vane extends from intermediate portion 60 at an acute angle such that water flowing into the entrance of the storm drain will be diverted in a manner to cause the downwardly located vanes 24 (FIG. 11) to move arcuately inwardly against the urging of the biasing cable 40 which is substantially identical in construction and operation to that previously described. This unique construction directs the fluid flowing into the upper portion of the storm drain in a direction toward the lower portion of the storm drain and toward the vanes 24 causing them to move arcuately inward, thereby maximizing the fluid flow through the storm drain.

Figure 14:
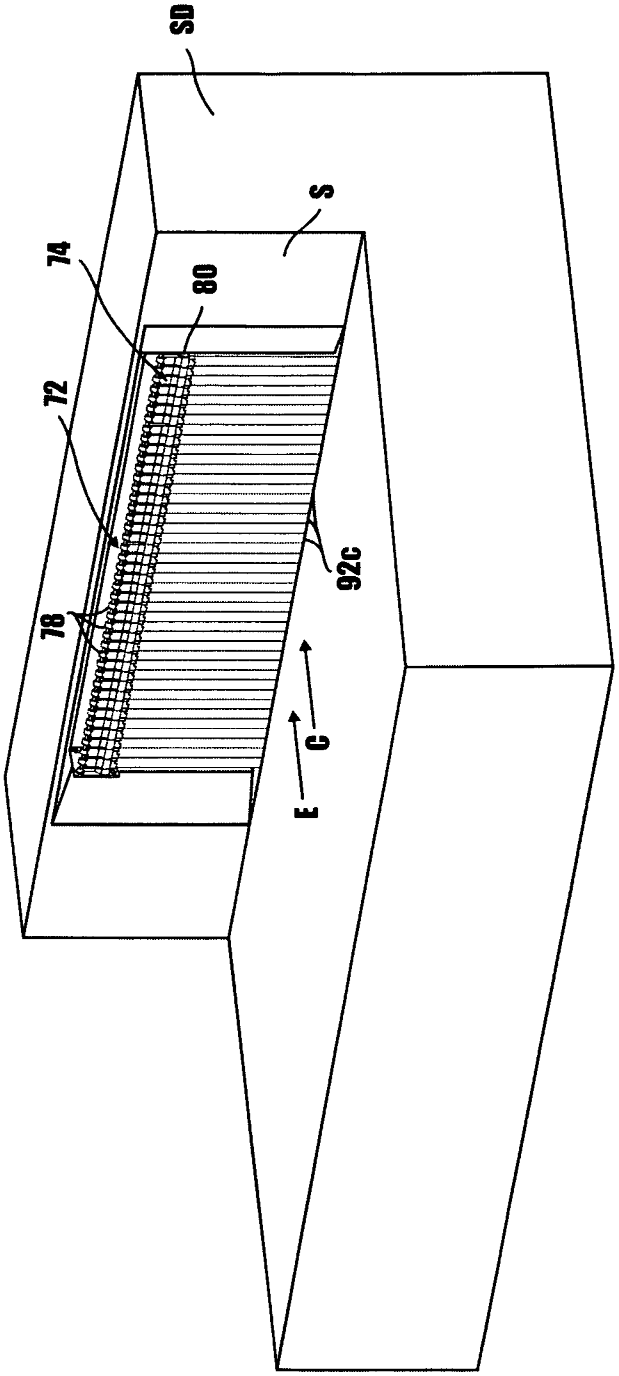
FIG. 14 is a generally perspective front view of still another form of the apparatus of the invention for fluid flow control and debris intercepting shown mounted in the conventional storm drain.
Figure 15:
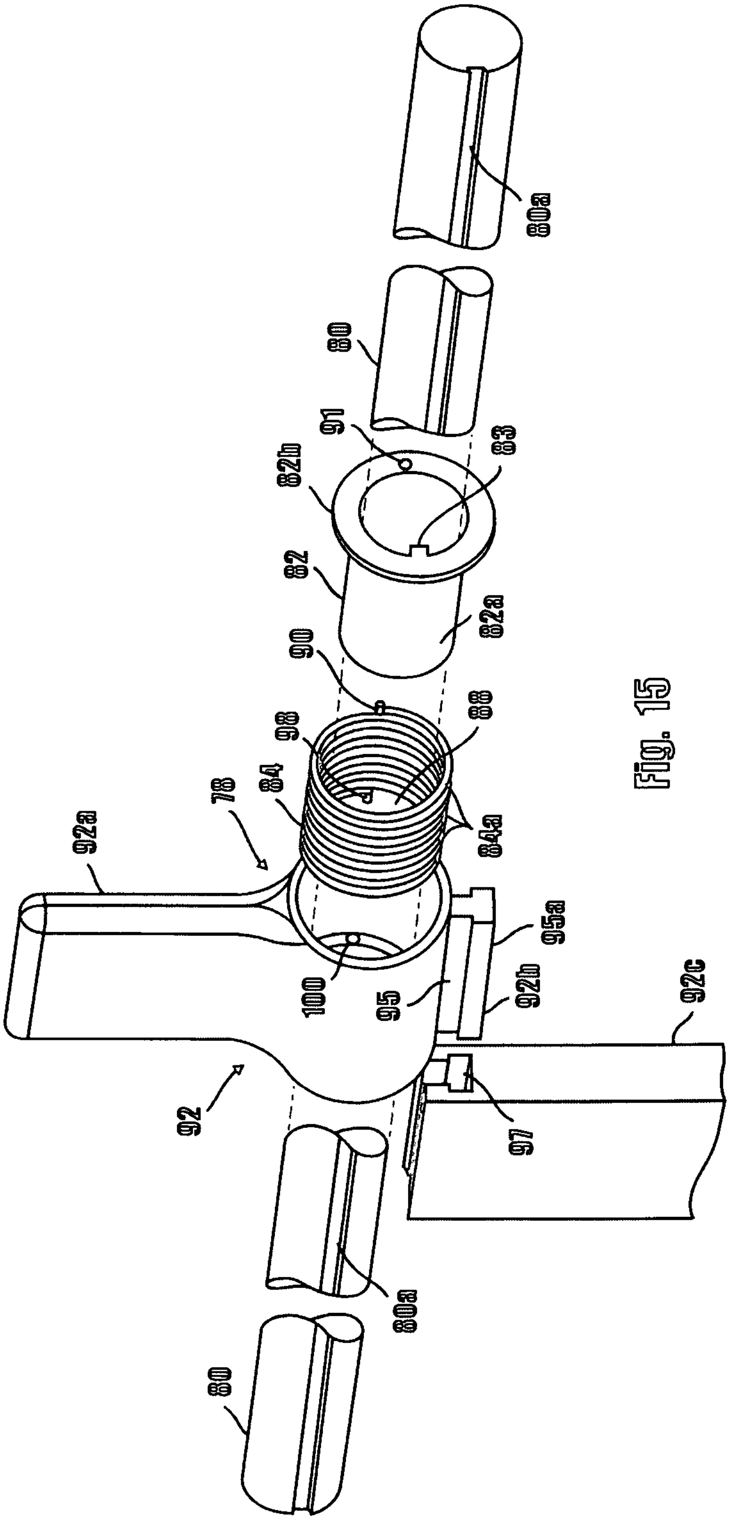
FIG. 15 is a generally perspective, exploded view of one of the plurality of transversely spaced apart, uniquely configured flow control vane assemblies of this latest form of the invention that are carried by a transversely extending support member that is connected to the storm drain and spans the flow channel thereof.

Referring now to FIGS. 14 and 15 of the drawings, still another form of the fluid flow control and debris intercepting apparatus of the invention is there shown as it appears when positioned within a conventional curbside storm drain. This form of the apparatus which is generally designated in the drawings by the numeral 72, functions to control the flow of fluid and the introduction of debris into the entrance "E" of the conventional storm drain "SD". Apparatus 72 is similar in some respects to the embodiment of the invention shown in FIGS. 1 through 3 and like numerals are used in FIGS. 14 and 15 to identify like components. In this latest form of the invention, the apparatus comprises a fluid flow control and debris intercepting gate assembly 74 that is made up of a plurality of transversely spaced apart flow control vane assemblies 78 that are carried by a differently configured support member 80 that includes a key way 80*a*.

Each of the flow control vane assemblies 78, the construction of which will presently be described, is movable relative to support member 80 between a first position and a second position permitting an increase in the volume of fluid flow through the fluid flow channel. As before, support member 80 is connected to structure "S" and spans the fluid flow channel "C". The fluid flow control and debris intercepting gate assembly 74, uniquely function to control fluid flow through the fluid flow channel "C" and to selectively block the entrance of debris into the channel "C".

As best seen in FIG. 15, each of the flow control vane assemblies 78 here comprises an intermediate member 82 having a generally tubular shaped body portion 82*a* having a key 83 that is slidably receivable within keyway 80*a* and a flange portion 82*b*. Also forming a part of each of the flow control vane assembly 78 is a yieldably deformable biasing member that is here provided in the form of a coil spring 84. Coil spring 84 includes a plurality of coils 84*a* that cooperate to define a generally cylindrically shaped opening 88 that telescopically receives the tubular body portion 82*a* of intermediate member 82. With this construction, coil spring 84 is carried by intermediate member 82 and is connected thereto by means of a first tang 90 that is formed on one of the outer coils of the spring member. First tang 90 is received within an opening 91 formed in flange portion 82*b*. Forming still another highly important part of each of the flow control vane assemblies 78 is a vane assembly 92 that is carried by intermediate member 82. In a manner presently to be described, each of the vane assemblies 92 is movable relative to the support member 80 between a first position and a second position permitting an increase in the volume of fluid flow through the fluid flow channel. In the present form of the invention, each of the vane assemblies 92 comprises an upper portion 92*a*, an intermediate portion 92*b* and a lower portion 92*c* that is removably interconnected with intermediate portion 92*b*. The intermediate portion 92*b* of each of the vane assemblies is provided with an opening 93 that is constructed and arranged to receive the biasing member, or coil spring 84. Connected to and extending outwardly from the lower surface of the intermediate portion 92*b* is a connector element 95 that includes a tongue portion 95*a*. The lower portion 92*c* of each of the vane assemblies is provided with a groove 97 that is adapted to slidably receive the tongue portion 95*a* of element 95. With this construction, vane assemblies having lower portions of various configurations can be removably connected to the intermediate portions of the vane assemblies. As previously mentioned, a coil spring 84 is telescopically receivable within opening 93 formed in the intermediate portion of each of the vane assemblies and is connected to the intermediate portion of the vane assembly by means of a second tang 98 that is formed on the inner coil of the coil spring. More particularly, second tang 98 is constructed and arranged to be received within an opening 100 formed in the wall 102 of the intermediate portion 92*b* of each of the vane assemblies.

With the construction described in the preceding paragraphs, the spring 84 of each of the flow control vane assemblies uniquely functions to yieldably resist rotational movement relative to intermediate member 82.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

The invention claimed is:

1. A fluid flow control and debris intercepting apparatus for controlling flow through a structure having an opening defining a fluid flow channel comprising:

(a) a support member connected to the structure and spanning the fluid flow channel;

(b) a plurality of transversely spaced apart flow control vanes carried by said support member for controlling fluid flow through the fluid flow channel, each of said flow control vanes being movable between a first position and a second position permitting an increase in the volume of fluid flow through the fluid flow channel; and (c) a yieldably deformable biasing member connected to each of said flow control vanes for resisting movement of each of said flow control vanes toward said second position, said biasing member comprising a coil spring connected to each of said flow control vanes.

2. The apparatus as defined in claim 1 in which each of said flow control vanes is provided with a transverse bore constructed and arranged to slidably receive said support member.

3. A fluid flow control and debris intercepting apparatus for controlling flow through a structure having an opening defining a fluid flow channel comprising:

(a) a support member connected to the structure and spanning the fluid flow channel; and (b) a plurality of transversely spaced apart flow control vane assemblies carried by said support member for controlling fluid flow through the fluid flow channel, each of said flow control vane assemblies comprising a vane assembly and being movable relative to said support member between a first position and a second position permitting an increase in the volume of fluid flow through the fluid flow channel, each said flow control vane assembly comprising:

(i) an intermediate member; and (ii) a yieldably deformable biasing member carried by and connected to said intermediate member and connected to said vane assembly for resisting movement of each of said flow control vane assemblies toward said second position.

4. The apparatus as defined in claim 3 in which said support member has a key-way and in which said intermediate member of each of said flow control vane assemblies has a key receivable within said key-way.

5. The apparatus as defined in claim 3 in which, each of said vane assemblies of each of said flow control assemblies comprises an upper portion, an intermediate portion provided with an opening constructed and arranged to receive said biasing member, a connector element connected to and extending from said intermediate portion and a lower portion removably connected to said connector element.

6. The apparatus as defined in claim 5 in which said connector element comprises a tongue and in which said lower portion of each of said vane assemblies is provided with a groove constructed and arranged to receive said tongue.

7. The apparatus as defined in claim 5 in which said yieldably deformable biasing member of each of said flow control assemblies comprises a coil spring having a first tang connected to said intermediate member and a second tang connected to said intermediate portion of said vane of each of said vane assemblies of each of said flow control assemblies.

* * * * *